(12) United States Patent
Cai et al.

(10) Patent No.: US 8,375,090 B2
(45) Date of Patent: Feb. 12, 2013

(54) ADVERTISEMENT BLOCKING IN IMS NETWORKS

(75) Inventors: Yigang Cai, Naperville, IL (US); Suzann Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 1024 days.

(21) Appl. No.: 12/392,420

(22) Filed: Feb. 25, 2009

(65) Prior Publication Data

US 2010/0216458 A1 Aug. 26, 2010

(51) Int. Cl.
 *G06F 15/16* (2006.01)
(52) U.S. Cl. ......................... 709/206; 709/228
(58) Field of Classification Search .................. 709/206, 709/227, 228, 229
See application file for complete search history.

(56) References Cited

U.S. PATENT DOCUMENTS

| 8,051,136 B2* | 11/2011 | Dingler et al. ............... 709/206 |
| 8,078,733 B2* | 12/2011 | Åström et al. ............... 709/227 |
| 8,134,956 B2* | 3/2012 | Siegel et al. ................. 370/328 |
| 2008/0235090 A1* | 9/2008 | Lundstrom et al. ............ 705/14 |
| 2009/0070694 A1* | 3/2009 | Ore et al. ..................... 715/764 |
| 2010/0082972 A1* | 4/2010 | Benco et al. ................. 713/155 |

* cited by examiner

*Primary Examiner* — Douglas Blair
(74) *Attorney, Agent, or Firm* — Duft Bornsen & Fishman LLP

(57) ABSTRACT

IMS networks and methods are disclosed for selectively blocking advertisement content on a per user identifier (ID) basis. A subscriber database in the IMS network, such as a Home Subscriber Server (HSS), stores service profiles for IMS users. The service profiles of the IMS users are also provisioned with advertisement blocking indicators that are associated with a user ID of the IMS users. When a request is received in the subscriber database for a service profile associated with a user ID, the subscriber database checks the advertisement blocking indicator associated with the user ID to see if advertisement content should be blocked for this user ID. If so, the subscriber database modifies initial filter criteria (iFC) associated with the user ID, which in essence blocks the advertisement content from being sent to the IMS user.

20 Claims, 8 Drawing Sheets

ADVERTISEMENT BLOCKING IN IMS NETWORKS

BACKGROUND OF THE INVENTION

1. Field of the Invention

The invention is related to the field of communication networks and, in particular, to blocking advertisements sent to IMS users over IMS networks.

2. Statement of the Problem

Service providers are accepting the IP Multimedia Subsystem (IMS) as the next generation network architecture. The IMS architecture is defined by the 3GPP to provide multimedia services to IMS devices over an Internet Protocol (IP) network, as IP networks have become the most cost savings bearer network to transmit video, voice, and data. IMS networks allow for delivery of multimedia content to IMS users in an efficient manner, which allows IMS users to exchange multimedia messages, share songs, share videos, play video games, etc.

One problem that IMS users may encounter is that advertisers may take advantage of the multimedia functionality of the IMS network by bombarding IMS users with unsolicited advertisements. An advertiser may transmit multimedia messages, video clips, pop-ups, and other advertisement content to IMS users over the IMS network. For example, an IMS user that has subscribed to a mobile television service may receive multimedia advertisements before or during the mobile television services. Unsolicited advertisements such as this may be annoying to an IMS user.

To provide these advertisements in an IMS network, the service provider operating the IMS network allows certain application servers to provide paid advertisements to the subscribers. For example, a first application server will provide video-related advertisements, and a second application server will provide audio-related advertisements. These application servers that are providing the paid advertisements are provisioned in the initial filter criteria (iFC) for the IMS users. The iFC causes the advertisements to be sent to the IMS users as follows. To register with the IMS network, the IMS device of an IMS user transmits a register message (i.e., a SIP REGISTER) to the Serving-Call Session Control Function (S-CSCF) for the IMS user. In response to the register message, the S-CSCF transmits a request for a service profile (i.e., a Diameter Server Assignment Request (SAR)) of the IMS user to the subscriber database (i.e., a Home Subscriber Server (HSS)). The subscriber database stores the service profile for the IMS user, which includes the iFC defined for the IMS user. The subscriber database then provides the service profile to the S-CSCF, such as in a Diameter Server Assignment Answer (SAA). The S-CSCF then processes the iFC to determine how to route subsequent SIP messages for the IMS user.

One assumption is that the iFC defined by the service provider includes conditions for contacting the first or second application servers (or other application servers) that provide advertisements when a SIP message is received. For example, if a SIP INVITE is received to initiate a video session with the IMS user, then the iFC may define that the first application server is to be included in the session to provide a video-related advertisement to the IMS user. Thus after processing the iFC, the S-CSCF transmits a SIP INVITE to the first application server, and the first application server responds to the S-CSCF with a SIP message (i.e., a SIP MESSAGE) that includes the video advertisement. The S-CSCF then forwards the SIP message with the video advertisement to the IMS user. The iFC defined for the IMS user thus causes the advertisements to be provided to the IMS user by the application servers.

One solution to the problem of unsolicited advertisements is to block the advertisements in the IMS network before the advertisements are actually sent to the IMS device (also referred to as User Equipment (UE)). There are a few proposals for how to block advertisements in the IMS network. For one proposal, when the S-CSCF receives a SIP message that is destined for the IMS user, the S-CSCF processes the content type for the message to determine if the SIP message may include an advertisement before forwarding the SIP message to the IMS user. If the SIP message may include an advertisement, then the S-CSCF forwards the SIP message to an application server that is programmed to screen advertisements. The screening application server then determines whether or not to block the advertisement before it is sent to the IMS user. One problem with this proposal is that a dedicated application server is needed to screen the advertisements.

In another proposal, the S-CSCF stores a black list of application servers that are known for sending advertisements, such as the first and second application servers described above. When the S-CSCF receives a SIP message destined for the IMS user, the S-CSCF identifies whether the SIP message was sent by an application server that is on the black list. If the application server is on the black list, then the S-CSCF blocks or discards the SIP message and does not send it to the IMS user. One problem with this proposal is that IMS users cannot be treated differently. In other words, the S-CSCF blocks advertisements from certain "black-listed" application servers regardless of which IMS user is the intended recipient of the advertisement. Some IMS users may want to receive advertisements, while others may not. This proposal does not allow the flexibility to treat IMS users differently with regard to receiving advertisements.

It would be desirable to efficiently and effectively allow service providers to block advertisements dynamically based on user preferences.

SUMMARY OF THE SOLUTION

Embodiments of the invention solve the above and other related problems by selectively blocking advertisement content in an IMS network on a per user identifier (ID) basis. The service profiles for IMS users, which are stored in a subscriber database (i.e., an HSS), are provisioned with advertisement blocking indicators that are associated with a user ID of the IMS users. When a request is received in the subscriber database for a service profile associated with a user ID, the subscriber database checks the advertisement blocking indicator associated with the user ID to see if advertisement content should be blocked for this user ID. If so, the subscriber database modifies the initial filter criteria (iFC) in the service profile associated with the user ID, which in essence blocks the advertisement content from being sent to the IMS user. And, because the advertisement blocking indicators are associated with user IDs, each user ID may be treated differently as to whether or not to receive advertisements.

In one embodiment, a subscriber database in an IMS network includes a storage system operable to store service profiles for IMS users. The subscriber database further includes a control system operable to receive input that includes user IDs for IMS users and includes advertisement blocking indicators. In response to receiving the input, the control system is further operable to provision the service profiles for the IMS users as stored in the storage system to associate the user IDs with an advertisement blocking indicator.

The subscriber database further includes a network interface operable to receive a request for a service profile for an IMS user from a network element in the IMS network, such as an S-CSCF or an application server. The request includes a user ID for the IMS user. In response to the request, the control system is further operable to identify a service profile associated with the user ID that includes initial filter criteria (iFC). The control system is further operable to process the advertisement blocking indicator associated with the user ID of the IMS user to determine if advertisement content is indicated as blocked for the user ID. If so, then the control system is further operable to process the service profile defined for the user ID of the IMS user to modify the initial filter criteria that relates to advertisement content so that the advertisement content will not be forwarded to the IMS user based on the user ID. The network interface is further operable to transmit the service profile for the IMS user to the network element with the modified iFC.

The network element may then process and store the modified iFC. If a SIP message or another signaling message is received for this user ID, then the network element will process the modified iFC in response to the message. Because the iFC has been modified by the subscriber database, the network element will not forward an unwanted or unsolicited advertisement to the IMS user. The subscriber database has essentially blocked the advertisement by modifying the iFC.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-9 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
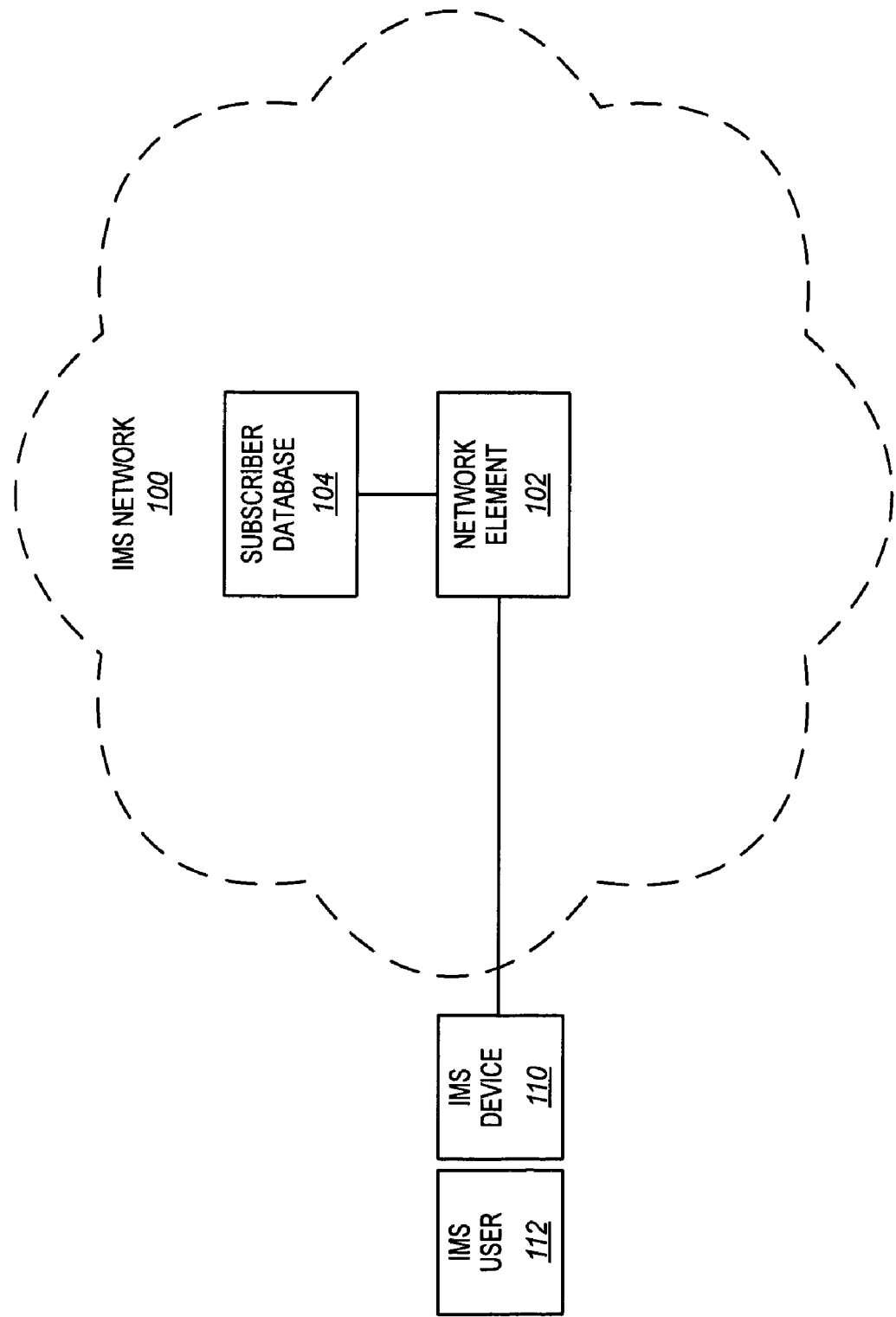
FIG. 1 illustrates an IMS network in an exemplary embodiment of the invention.

FIG. 1 illustrates an IMS network 100 in an exemplary embodiment of the invention. IMS network 100 includes a network element 102 and a subscriber database 104. Network element 102 comprises any server(s), function(s), or other system(s) operable to provide call/session control or to provide services or features for a call/session in IMS network 100. One example of a network element that provides call/session control is a Serving-Call Session Control Function (S-CSCF). One example of a network element that provides services or features for a call/session is an application server (AS). Subscriber database 104 comprises any server(s), function(s), or other system(s) operable to store service profiles or other information for IMS users. One example of a subscriber database is a Home Subscriber Server (HSS).

IMS network 100 is illustrated as providing service to an IMS device 110 that is operated by IMS user 112. IMS device 110 may be a SIP-enabled device or another type of device operable to communicate with IMS network 100. IMS device 110 may comprise a wireline device, or may comprise a wireless or mobile device operable to communicate with IMS network 100 through the appropriate wireless access network. The wireless access network may comprise a WiFi network, a WiMAX network, or another type of WLAN using protocols such as 802.11b, 802.11g, or Bluetooth. The wireless access network may alternatively comprise a cellular network, such as a CDMA or a GSM network.

Although not specifically illustrated in FIG. 1, subscriber database 104 is provisioned with one or more service profiles for IMS user 112. A typical service profile for an IMS user includes a user identifier (ID) associated with the service profile, includes service definitions or authorizations, and includes a list of initial filter criteria (iFC). The user ID is assigned to the IMS user to identify the IMS user within the IMS network, such as a directory number for the IMS user, a URI for the IMS user, etc. The user ID may comprise a Public User ID (PUID), although the user ID may alternatively comprise an IMPU, a Private User ID (PRID), or some other identifier. The service definitions or authorizations define the features, services, media types, etc, subscribed to by the IMS user. The iFC define SIP routing information for routing SIP requests originated from or destined for IMS user 112. The iFC are processed one after another (typically by priority) by a network element, such as an S-CSCF. The iFC define conditions to be met by a SIP request, and actions to be taken if the conditions are met, such as routing the SIP request to an application server.

IMS user 112 may have multiple user IDs assigned by IMS network 100. As a result, subscriber database 104 may store multiple service profiles for IMS user 112 with each service profile associated with one of the user IDs of the IMS user 112.

Figure 2:
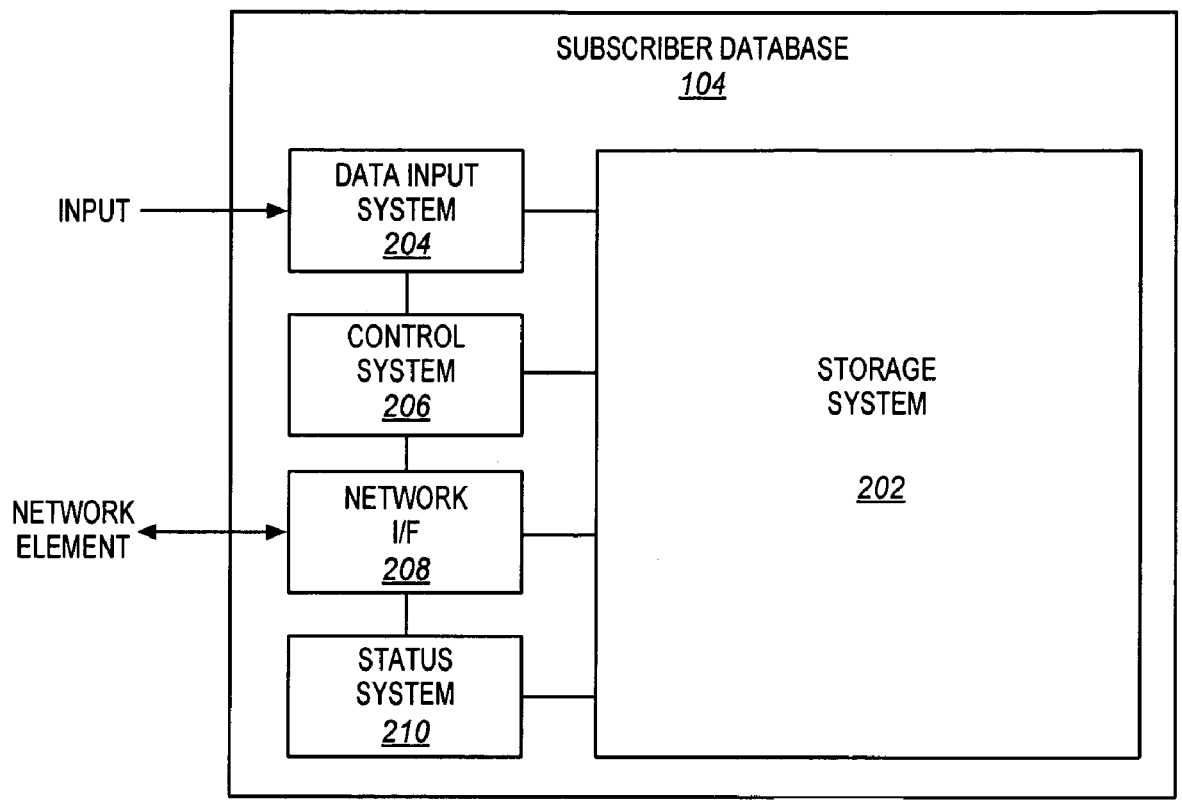
FIG. 2 illustrates a subscriber database in an exemplary embodiment of the invention.

FIG. 2 illustrates subscriber database 104 in an exemplary embodiment of the invention. Subscriber database 104 includes a storage system 202, a data input system 204, a control system 206, a network interface 208, and a status system 210. Storage system 202 comprises any memory, database, etc, operable to store one or more service profiles of IMS users. Data input system 204 comprises any components or functions operable to receive input from IMS user 112, a service provider, or some other user to add, modify, or delete a service profile of an IMS user as stored in storage system 202. Control system 206 comprises any components or functions operable to access service profiles stored in storage system 202 to add, modify, or delete the service profiles. Network interface 208 comprises any components or functions operable to communicate with one or more network elements in IMS network 100. Status system 210 comprises any components or functions operable to identify status changes to service profiles in storage system 202.

Any of the elements of subscriber database 104 may be implemented as hardware, software, firmware, or some combination of these. For example, an element of subscriber database 104 may be implemented as one or more processors executing instructions. Alternatively, an element of subscriber database 104 may be implemented as a programmable gate array, a circuit or circuitry, logic, or some other physical hardware component that is not entirely software based.

IMS network 100 of FIG. 1 provides the functionality of selectively blocking advertisement content to IMS user 112 on a per user ID basis. IMS network 100 may include one or more application servers (not shown) that are operable to transmit advertisement content to IMS user 112 during a session or between sessions. Subscriber database 104 operates as described below to provide selective blocking of the advertisement content.

Figure 3:
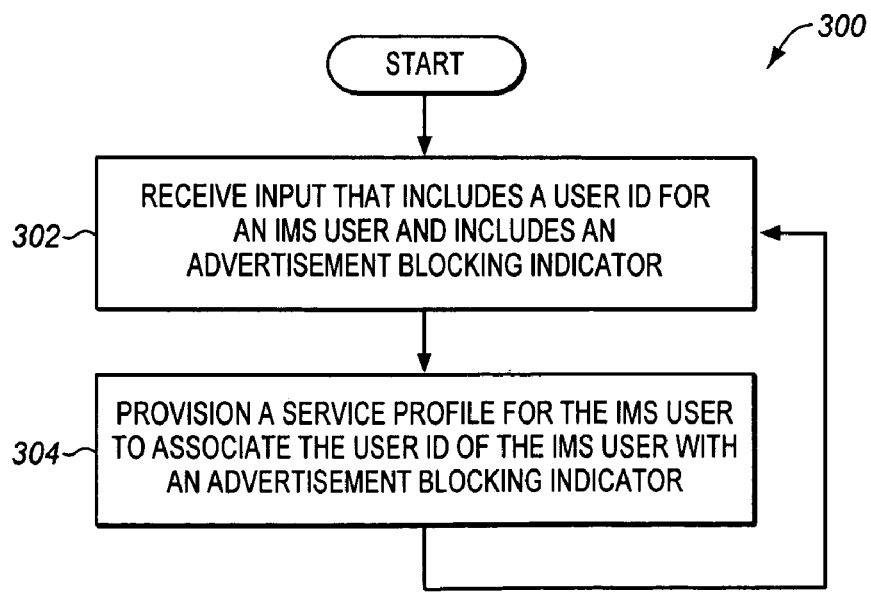
FIG. 3 is a flow chart illustrating a method of provisioning a subscriber database in an exemplary embodiment of the invention.

FIG. 3 is a flow chart illustrating a method 300 of provisioning subscriber database 104 in an exemplary embodiment of the invention. The steps of method 300 will be described with reference to IMS network 100 in FIG. 1 and subscriber database 104 in FIG. 2. The steps of the flow chart in FIG. 3 are not all inclusive and may include other steps not shown.

In step 302, data input system 204 receives input that includes a user ID for IMS user 112 and includes an advertisement blocking indicator. The advertisement blocking indicator comprises a flag, a code, or some other data indicating whether or not to invoke advertisement blocking. Data input system 204 may provide a web interface that allows IMS user 112, the service provider, or another user to enter the user ID for IMS user 112 and set the advertisement blocking indicator. Alternatively, data input system 204 may interact with IMS device 110 to allow IMS user 112 to set the advertisement blocking indicator, such as through a feature code or special instruction.

In step 304, control system 206 provisions the service profile of IMS user 112 as stored in storage system 202 to associate the user ID of IMS user 112 with the advertisement blocking indicator. "Provisioning" refers to programming or defining data in the service profile. Method 300 repeats any number of times so that IMS users are able to provision their service profile with the desired advertisement blocking indicator. Subscriber database 104 thus stores advertisement blocking indicators that are associated with a user ID for the IMS users, such as for those IMS users that subscribe to an advertisement blocking service.

Figure 4:
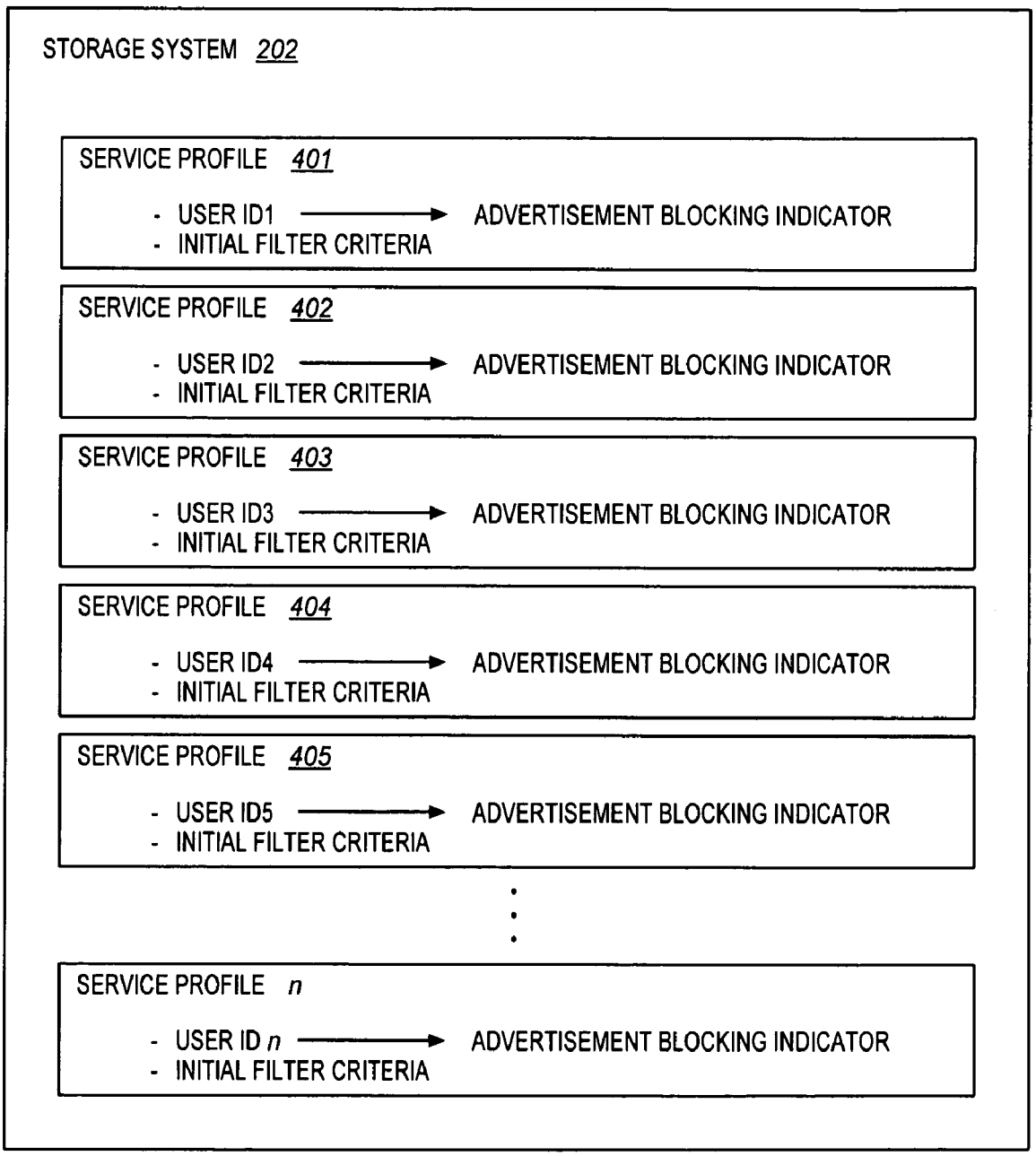
FIG. 4 illustrates a storage system of a subscriber database provisioned with advertisement blocking indicators on a per user ID basis in an exemplary embodiment of the invention.

FIG. 4 illustrates storage system 202 of subscriber database 104 provisioned with advertisement blocking indicators on a per user ID basis. For example, service profiles 401-405 are each provisioned with a different user ID. Within each service profile 401-405, an advertisement blocking indicator is associated with the user ID (indicated by an arrow). The advertisement blocking indicator may actually comprise an integer value, a code, or some other data, such as a "Y" or "N". Each service profile 401-405 is also provisioned with initial filter criteria (iFC) defined for the user ID.

Figure 5:
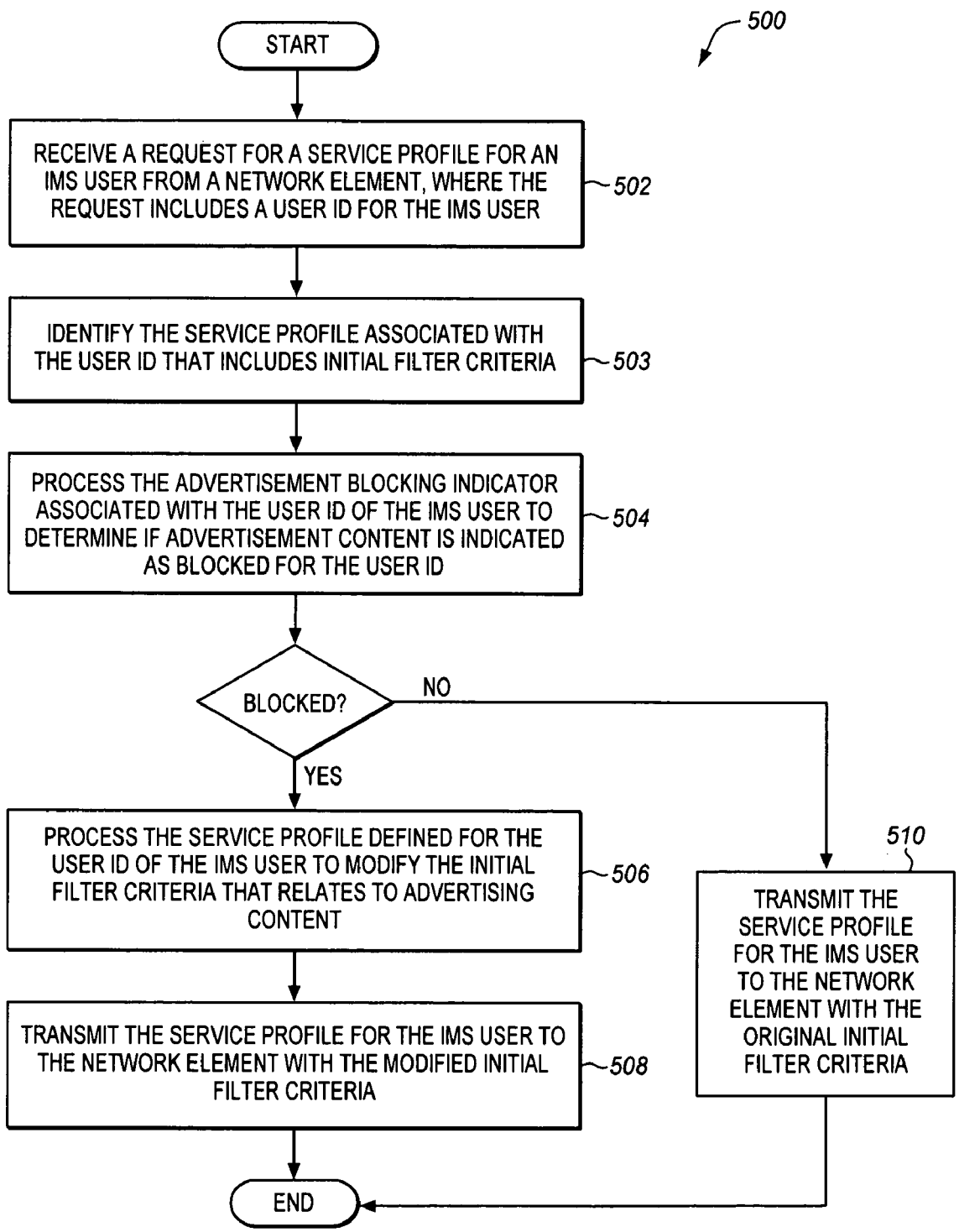
FIG. 5 is a flow chart illustrating a method of blocking advertisement content in an exemplary embodiment of the invention.

With subscriber database 104 properly provisioned, subscriber database 104 is able to assist in blocking advertisement content in the following manner. FIG. 5 is a flow chart illustrating a method 500 of blocking advertisement content in an exemplary embodiment of the invention. The steps of method 500 will be described with reference to IMS network 100 in FIG. 1 and subscriber database 104 in FIG. 2. The steps of the flow chart in FIG. 5 are not all inclusive and may include other steps not shown.

In step 502, network interface 208 receives a request for a service profile for IMS user 112 from network element 102. The request from network element 102 includes a user ID for IMS user 112. For example, assume that IMS device 110 registers or re-registers with IMS network 100 by transmitting a register message (e.g., a SIP REGISTER) to network element 102. The register message from IMS device 110 includes a user ID for IMS user 112. In response to the register message, network element 102 determines that it needs the service profile associated with the user ID of IMS user 112. Thus, network element 102 transmits a request (e.g., a Diameter Server Assignment Request (SAR)) for the service profile to subscriber database 104.

In response to the request from network element 102, control system 206 identifies the service profile associated with the user ID provided in the request, which is stored in storage system 202, in step 503. The service profile includes initial filter criteria (iFC) defined for the user ID. Control system 206 processes the service profile associated with the user ID to identify the advertisement blocking indicator provisioned in the service profile. Control system 206 then processes the advertisement blocking indicator associated with the user ID to determine if advertisement content is indicated as blocked for the user ID in step 504.

As an example, the advertisement blocking indicator provisioned in the service profile for IMS user 112 may indicate "Y" or "N". If the advertisement blocking indicator is set to "Y", then advertisement content is indicated as blocked for this particular user ID of IMS user 112. If the advertisement blocking indicator is set to "N", then advertisement content is not indicated as blocked for this particular user ID of IMS user 112. As IMS user 112 may have multiple user IDs associated with different advertisement blocking indicators, control system 206 looks to this particular user ID in making the determination of step 504.

If the advertisement content is indicated as blocked for this user ID, then control system 206 processes the service profile defined for the user ID to modify the iFC that relates to advertisement content in step 506. The iFC is modified so that advertisement content will not be forwarded to IMS user 112 based on the user ID. To modify the iFC, control system 206 may remove the iFC that relates to advertisement content, may set the iFC that relates to advertisement content to inactive, or may otherwise alter the iFC so that advertisement content will be blocked by network element 102 or another network element in IMS network 100.

In step 508, network interface 208 transmits the service profile for IMS user 112 to the network element 102 with the modified iFC. In response to receiving the service profile, network interface 208 stores the modified iFC for the user ID to subsequently handle SIP requests corresponding with this user ID.

Control system 206 does not necessarily modify the iFC in the service profile that is stored in storage system 202, but may instead modify the iFC that is being provided to network element 102. Thus, control system 206 inserts the modified iFC in the service profile instead of the original iFC before transmitting the service profile to network element 102. The original iFC may remain in storage system 202 so that IMS user 112 may change the advertisement blocking indicator at a later time.

If the advertisement content is not indicated as blocked for this user ID, then control system 206 does not modify the iFC that relates to advertisement content. Network interface 208 will thus transmit the service profile to network element with the original iFC in step 510.

In FIG. 1, assume that network element 102 receives a SIP request, such as a SIP INVITE or a SIP MESSAGE, that includes the user ID of IMS user 112 as an originator or a destination. Network element 102 processes the iFC defined for the user ID to determine how to operate in response to the SIP request. If subscriber database 104 has modified the iFC, then network element 102 will not access an application server that provides advertisement content in response to the SIP request. The modified iFC thus "blocks" advertisement content from being sent to IMS user 112.

Figure 6:
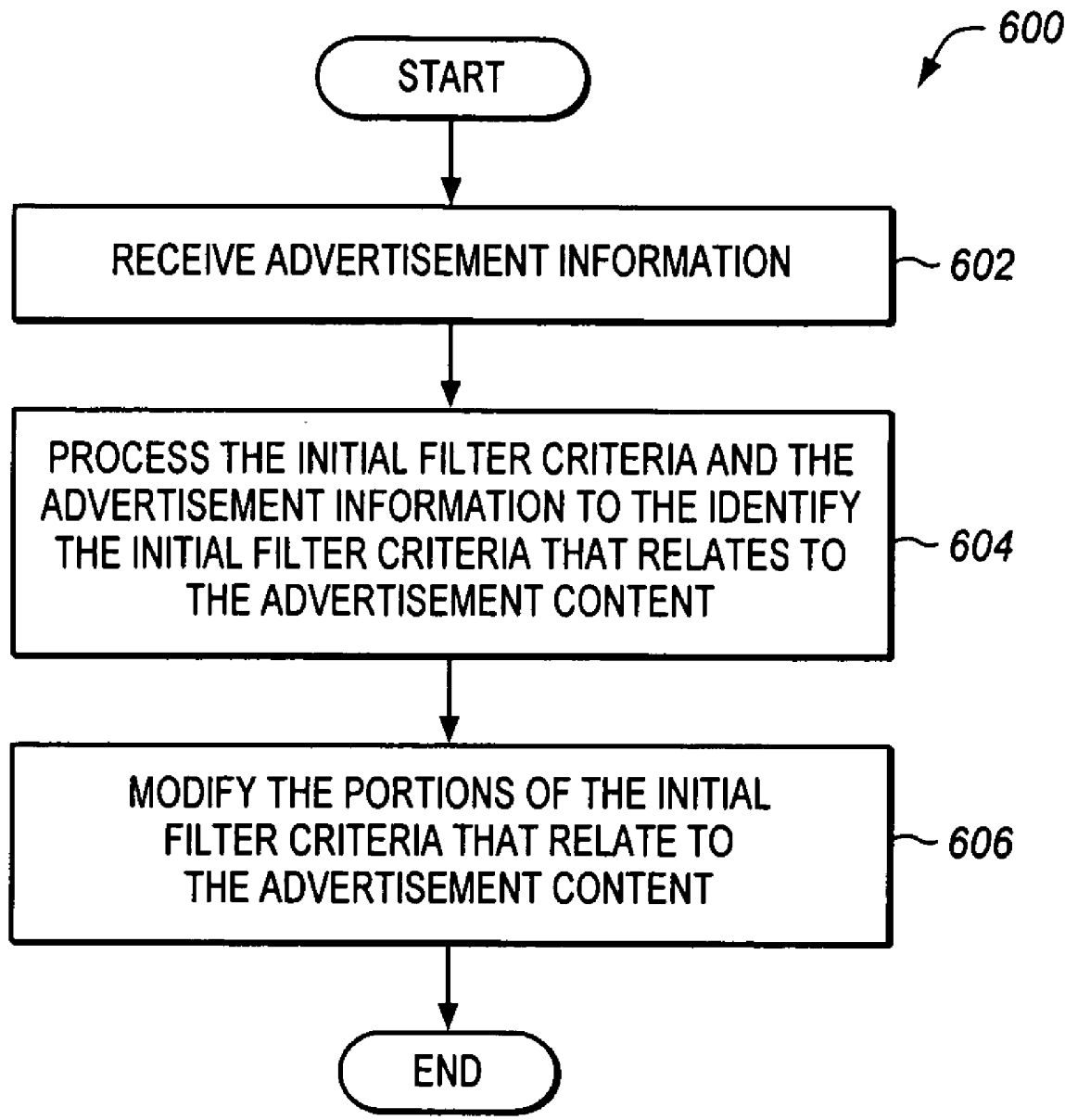
FIG. 6 is a flow chart illustrating a method of handling iFC that relates to advertisement content in an exemplary embodiment of the invention.

In step 506 of FIG. 5, control system 206 modifies the iFC in the service profile for IMS user 112 that relates to advertisement content. The iFC that relates to advertisement content comprises particular criteria that cause a SIP message or another type of message that includes advertisement content to be forwarded to an IMS user. FIG. 6 is a flow chart illustrating a method 600 of handling iFC that relates to advertisement content in an exemplary embodiment of the invention. In step 602, control system 206 (see also FIG. 2) receives advertisement information, which comprises any information or data regarding advertisements or providers of advertisement content within IMS network 100. The advertisement information may comprise a list (by name or network address) of application servers in IMS network 100 that are known or suspected of providing advertisement content. The advertisement information may alternatively comprise one or more key words that are used in the advertisement content. The advertisement information may be provisioned by the service provider or by another party. Also, the advertisement information may be globally defined for all of the user IDs stored in subscriber database 104, or may be selectively defined for individual user IDs.

In step 604, control system 206 processes the iFC and the advertisement information to identify the iFC that relates to the advertisement content. For example, if the advertisement information comprises a list of application servers, then control system 206 processes the iFC to determine if the destination application server for any portion of the iFC is in the list of application servers. If so, then control system 206 determines this portion of the iFC to be related to advertisement content. If the advertisement information comprises one or more key words, then control system 206 processes the iFC to determine if the destination application server for any portion of the iFC includes the keyword(s). If so, then control system 206 determines this portion of the iFC to be related to advertisement content.

In step 606, control system 206 modifies the portions of the iFC that relate to the advertisement content. By modifying the iFC that relate to advertisement content, control system 206 is in essence disabling the iFC from causing an application server from being added to a session and providing the advertisement content to IMS user 112.

After the iFC has been downloaded from subscriber database 104 to network element 102, there may be instances where an advertising blocking indicator for one or more user IDs, or the advertisement information is changed within subscriber database 104. In response to a change such as this, the iFC downloaded to network element 102 should be updated.

Figure 7:
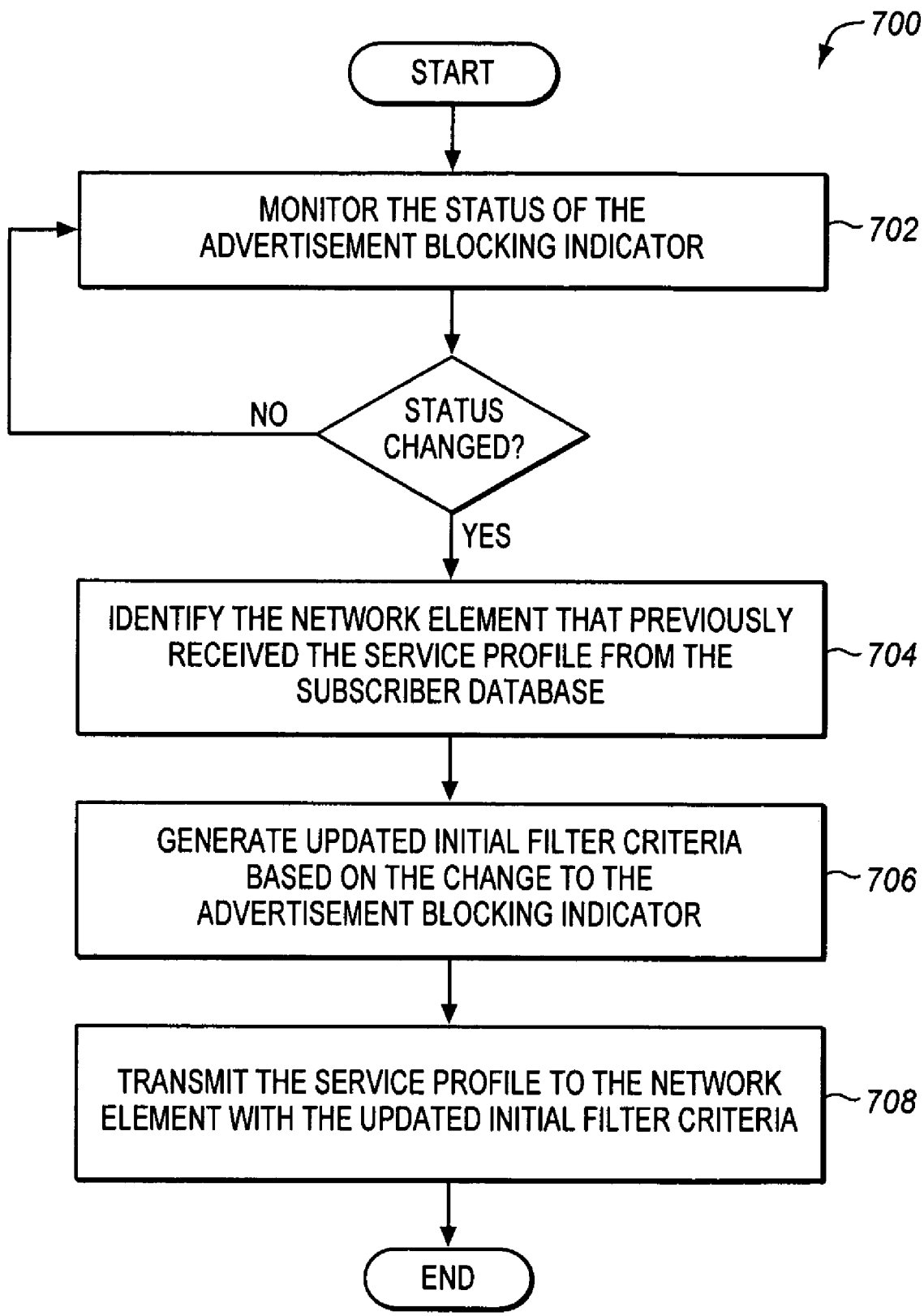
FIG. 7 is a flow chart illustrating a method of updating iFC in an exemplary embodiment of the invention.

FIG. 7 is a flow chart illustrating a method 700 of updating iFC in an exemplary embodiment of the invention. In step 702, status system 210 (see also FIG. 2) monitors the status of the advertisement blocking indicator in the service profile of IMS user 112 for changes. For example, status system 210 may monitor the advertisement blocking indicator for a change from "Y" to "N" or from "N" to "Y". If the status of the advertisement blocking indicator changes, then control system 206 identifies the network element 102 that previously received the service profile from subscriber database 104 in step 704. In step 706, control system 206 generates updated iFC based on the change to the advertisement blocking indicator. Control system 206 then transmits the service profile for IMS user 112 to network element 102 with the updated iFC in step 708. Network element 102 may then process the updated iFC for the user ID when receiving a SIP request for that user ID.

For example, if the advertisement blocking indicator changes from "Y" to "N", then IMS user 112 has disabled advertisement blocking for this user ID. Thus, control system 206 generates updated iFC, which comprises the original iFC defined for the user ID. If the advertisement blocking indicator changes from "N" to "Y", then IMS user 112 enabled advertisement blocking for this user ID. Thus, control system 206 generates updated iFC by modifying the original iFC that relates to advertisement content to disable this particular iFC.

A similar process occurs for changes to the advertisement information. Status system 210 monitors the status of the advertisement information that is provisioned in storage system 202. For example, status system 210 may monitor a list of application servers known to provide advertisement content for the addition of a new application server to the list or the removal of an application server from the list. If the status of the advertisement information changes, then control system 206 identifies the network element 102 that previously received the service profile from subscriber database 104. Control system 206 updates the iFC based on the change to the advertisement information, and transmits the service profile to network element 102 with the updated iFC.

EXAMPLE

Figure 8:
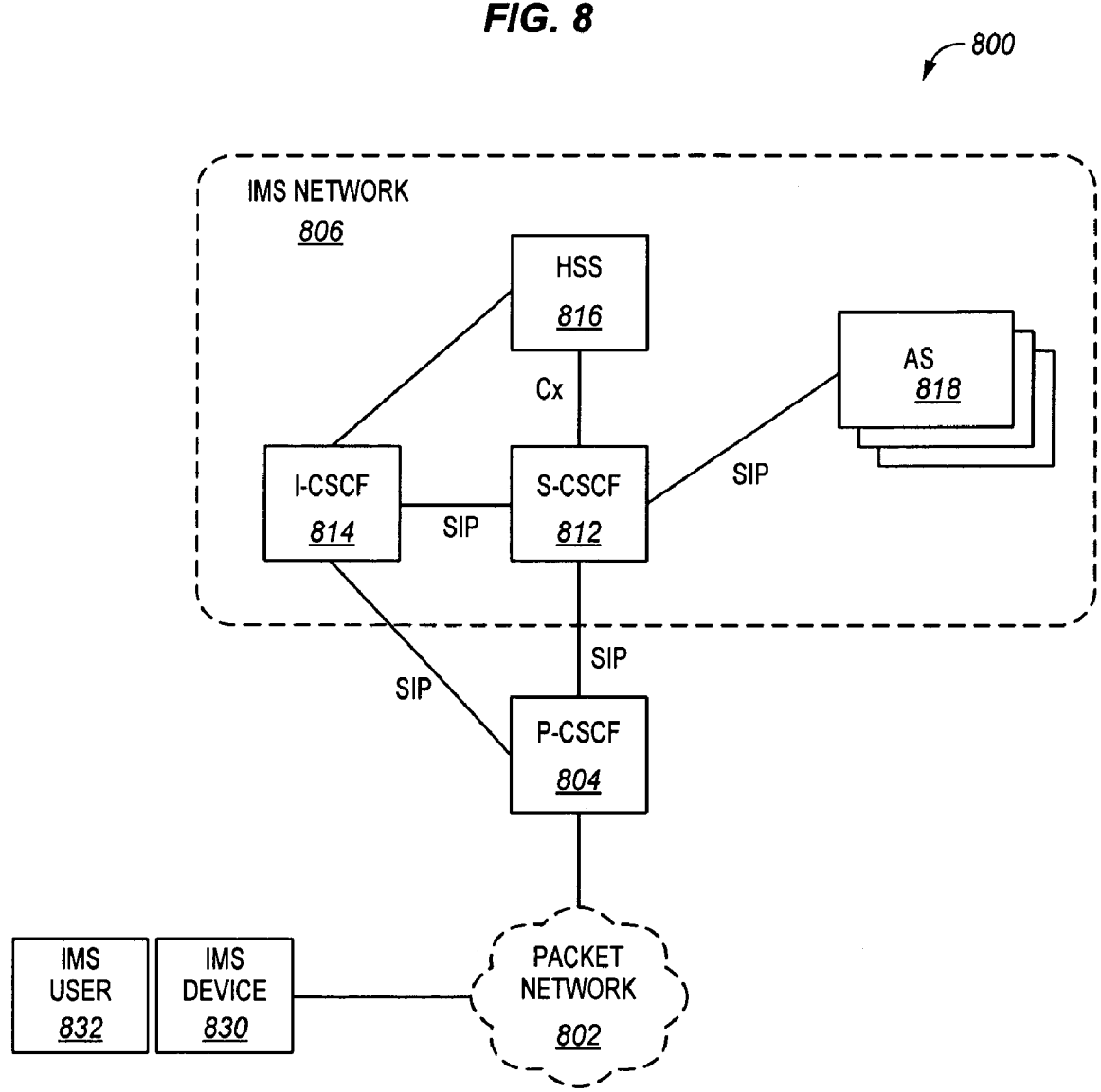
FIG. 8 illustrates a communication network in an exemplary embodiment of the invention.
Figure 9:
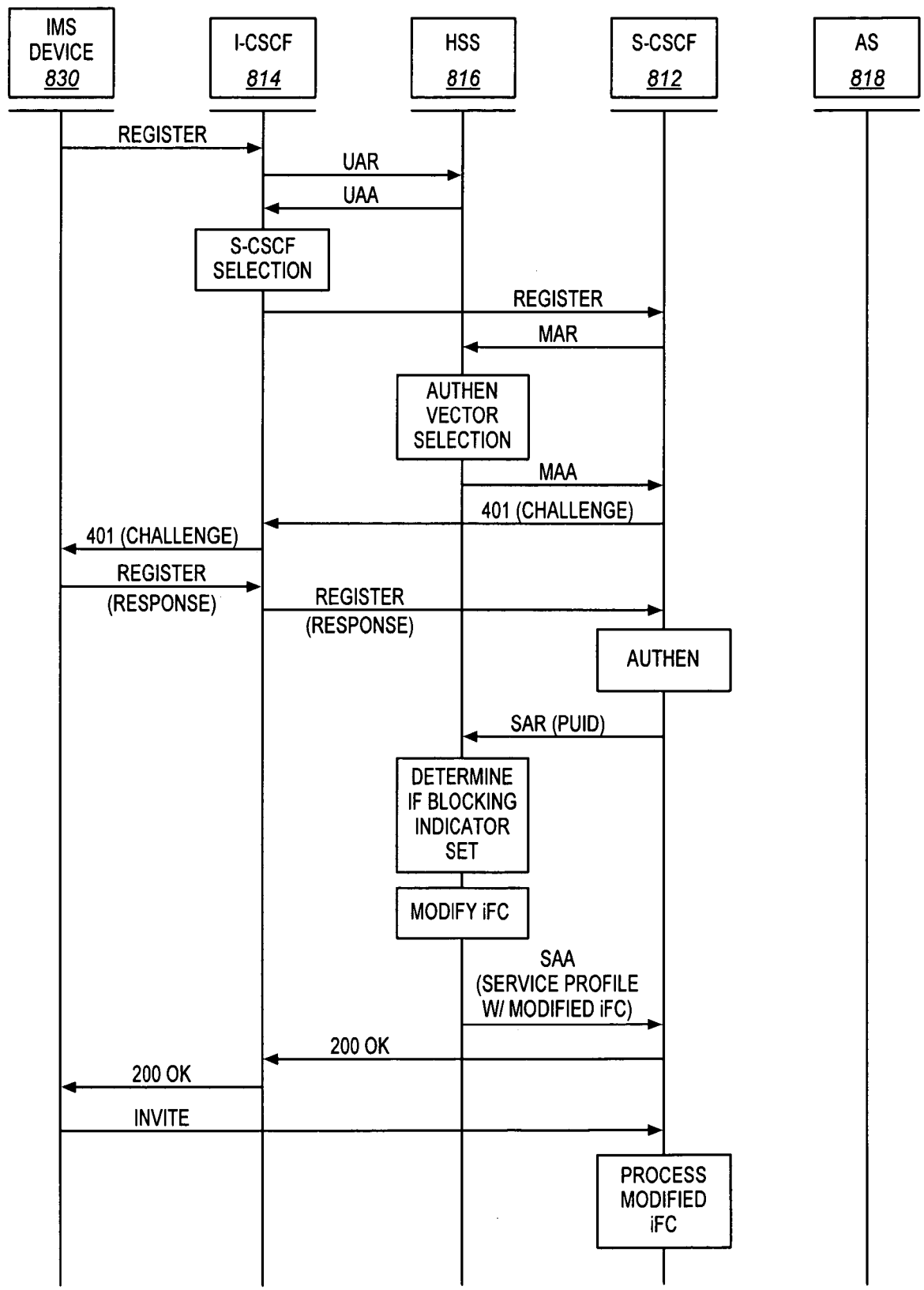
FIG. 9 is a message diagram illustrating messaging used to register an IMS device with an IMS network and blocking advertisement content in an exemplary embodiment of the invention.

FIGS. 8-9 illustrate an example of operating an IMS network to block advertisement content from an IMS user on a per PUID basis. FIG. 8 illustrates a communication network 800 in an exemplary embodiment of the invention. Communication network 800 includes a packet network 802, a Proxy-CSCF (P-CSCF) 804, and an IMS network 806. IMS network 806 includes an S-CSCF 812, an Interrogate-CSCF (I-CSCF) 814, an HSS 816, and a one or more application servers (AS) 818. An IMS device 830 connects to IMS network 806 through packet network 802.

HSS 816 is provisioned with a service profile for IMS user 832. Assume for this example that iFC in the service profile of IMS user 832 includes criteria that define the following:

---

IF SIP_Method = "INVITE" AND Media_Type = "streaming video"
THEN
    Send "SIP INVITE" to application server 818
END IF

---

Further assume that application server 818 is configured to send advertisement content to an IMS user responsive to receiving a SIP INVITE. Thus, this iFC is defined to provide an advertisement to IMS user 832 when this user initiates a video session, such as a mobile television service.

FIG. 9 is a message diagram illustrating messaging used to register IMS device 830 with IMS network 806 and blocking advertisement content in an exemplary embodiment of the invention. To begin, IMS device 830 generates a SIP REGISTER in order to register with IMS network 806, and transmits the SIP REGISTER to I-CSCF 814 through packet network 802 and P-CSCF 804. Responsive to receiving the SIP REGISTER, I-CSCF 814 generates a Diameter User Authentication Request (UAR), and transmits the Diameter UAR to HSS 816. HSS 816 then responds to the UAR with a Diameter User Authentication Answer (UAA). Responsive to receiving the Diameter UAA, I-CSCF 814 selects the S-CSCF 812 to serve IMS device 830. I-CSCF 814 then transmits the SIP REGISTER to S-CSCF 812.

Responsive to receiving the SIP REGISTER, S-CSCF 812 generates a Diameter Multimedia Authentication Request (MAR) to continue the process of registering IMS device 830. S-CSCF 812 includes a private identifier (PRID) and/or a public identifier (PUID) for IMS user 832 in the Diameter MAR, and transmits the MAR to HSS 816. HSS 816 processes the PRID in the Diameter MAR to generate an AKA vector based on the AKA authentication method. HSS 816 then generates a Diameter Multimedia Authentication Answer (MAA) in response to the Diameter MAR, and includes the AKA vector in the Diameter MAA, such as in the SIP-Authenticate AVP of the MAA. Responsive to receiving the MAA, S-CSCF 812 transmits a SIP 401 (Challenge) message to IMS device 830 (through P-CSCF 804 and packet network 802) to challenge IMS device 830 for an authentication check. IMS device 830 receives the SIP 401, and calculates the authentication response. IMS device 830 then generates another SIP REGISTER (response) message and transmits the SIP REGISTER back to S-CSCF 812. Responsive to receiving the SIP REGISTER, S-CSCF 812 processes the authentication response in relation to the authentication vector to determine whether IMS device 830 is authenticated.

If IMS device 830 is authenticated, then S-CSCF 812 generates a Diameter Server Assignment Request (SAR) to retrieve the service profile for IMS user 832 of IMS device 830 from HSS 816. S-CSCF 812 inserts the PUID for IMS user 832 in the Diameter SAR, and transmits the Diameter SAR to HSS 816 over Cx interface. Responsive to receiving the Diameter SAR, HSS 816 identifies the service profile for IMS user 832 based on the PUID. HSS 816 is pre-provisioned with the service profiles for IMS users. The service profile associated with the PUID is provisioned with an advertisement blocking indicator, and with iFC. The advertisement blocking indicator is associated with the PUID of IMS user 832.

HSS 816 processes the advertisement blocking indicator associated with the PUID of IMS user 832 to determine if advertisement content is indicated as blocked for this PUID. Assume in this embodiment that the advertisement blocking indicator is set to "Y". HSS 816 processes the iFC in the service profile to identify the portions of the iFC that relate to the advertisement content. Assume, for example, that HSS 816 is provisioned with a global list of application servers in IMS network 806 that are known to provide advertisement content. This list includes application server 818. HSS 816 processes the iFC to determine if the destination application server for any portion of the iFC is in the list of application servers known to provide advertisement content. In this example, the iFC for IMS user 832 does include the following criteria:

```
IF SIP_Method = "INVITE" AND Media_Type = "streaming video"
THEN
    Send "SIP INVITE" to application server 818
END IF
```

The iFC does include a destination to application server 818, which is on the list of application servers known to provide advertisement content. Thus, HSS 816 determines this portion of the iFC to be related to advertisement content, and modifies the portions of the iFC that relate to the advertisement content to "disable" these portions of the iFC. In other words, HSS 816 may remove or inactivate the portions of the iFC that relate to application server 818 (or other application servers that provide advertisement content). HSS 816 then generates a Diameter Server Assignment Answer (SAA), and includes the service profile for IMS user 832 in the Diameter SAA. Again, the service profile that is inserted in the SAA includes the modified iFC. HSS 816 transmits the Diameter SAA to S-CSCF 812 over the Cx interface.

Responsive to receiving the Diameter SAA, S-CSCF 812 generates a SIP 200 OK message and transmits the 200 OK to IMS device 830 (through P-CSCF 804 and packet network 802). S-CSCF 812 also stores the service profile for IMS user 832, which includes the modified iFC, to handle subsequent SIP requests.

Assume now that S-CSCF 812 receives a SIP INVITE from IMS device 830 to initiate a mobile television session. In response to the SIP INVITE, S-CSCF 812 processes the modified iFC associated with the PUID of IMS user 832. Because the iFC has been modified to remove the iFC described above, S-CSCF 812 will not transmit a SIP INVITE to application server 818 (notice no INVITE is sent to application server 818 in FIG. 9). Thus, application server 818 will not provide the advertisement content to IMS user 832, and the advertisement is effectively blocked due to the actions of HSS 816. If the iFC were not modified by HSS 816, then S-CSCF 812 would transmit a SIP INVITE to application server 818 according to the original iFC. Application server 818 would then send the advertisement content to IMS user 832 in response to the INVITE. Thus, the modification of the iFC helps to block the advertisement content from being sent to IMS user 832.

Although specific embodiments were described herein, the scope of the invention is not limited to those specific embodiments. The scope of the invention is defined by the following claims and any equivalents thereof.

We claim:

1. A subscriber database in an IP Multimedia Subsystem (IMS) network, the subscriber database comprising:
   a storage system operable to store service profiles for IMS users;
   a control system including hardware that is operable to receive input that includes user identifiers for IMS users and includes advertisement blocking indicators, and to provision the service profiles for the IMS users as stored in the storage system to associate the user identifiers with the advertisement blocking indicators; and
   a network interface operable to receive a request for a service profile for an IMS user from a network element in the IMS network, wherein the request includes a user identifier for the IMS user;
   the control system is further operable to identify the service profile associated with the user identifier received in the request by the network interface, wherein the service profile includes initial filter criteria, and to process an advertisement blocking indicator associated with the user identifier to determine if advertisement content is indicated as blocked for the user identifier;

if the advertisement content is indicated as blocked for the user identifier, then the control system is further operable to process the service profile defined for the user identifier of the IMS user to modify initial filter criteria that relates to advertisement content so that advertisement content will not be forwarded to the IMS user based on the user identifier;

the network interface is further operable to transmit the service profile for the IMS user to the network element with the modified initial filter criteria.

2. The subscriber database of claim 1 wherein:

the control system is further operable to remove the initial filter criteria that relates to advertisement content before transmitting the service profile to the network element.

3. The subscriber database of claim 1 wherein:

the control system is further operable to set the initial filter criteria that relates to advertisement content to inactive before transmitting the service profile to the network element.

4. The subscriber database of claim 1 further comprising:

a data input system operable to receive advertisement information;

wherein the control system is further operable to process the initial filter criteria and the advertisement information to identify the initial filter criteria that relates to advertisement content, and to modify the portions of the initial filter criteria that relate to advertisement content.

5. The subscriber database of claim 4 wherein the advertisement information comprises a list of application servers that provide advertisement content in the IMS network.

6. The subscriber database of claim 1 wherein:

the subscriber database comprises a Home Subscriber Server (HSS); and the network element comprises a call session control function (CSCF).

7. The subscriber database of claim 1 wherein:

the subscriber database comprises a Home Subscriber Server (HSS); and the network element comprises an application server.

8. The subscriber database of claim 1 further comprising:

a status system operable to monitor the status of the advertisement blocking indicator in the service profile of the IMS user for which the service profile is requested;

if the status of the advertisement blocking indicator changes, then the control system is further operable to identify the network element that previously received the service profile from the subscriber database, to generate updated initial filter criteria based on the change to the advertisement blocking indicator, and to transmit the service profile to the network element with the updated initial filter criteria.

9. A method of blocking advertisements in an IP Multimedia Subsystem (IMS) network, the method comprising:

receiving, in a subscriber database of the IMS network, input that includes user identifiers for IMS users and includes advertisement blocking indicators;

provisioning service profiles for the IMS users in the subscriber database to associate the user identifiers with the advertisement blocking indicators;

receiving, in the subscriber database, a request for a service profile for an IMS user from a network element in the IMS network, wherein the request includes a user identifier for the IMS user;

identifying the service profile associated with the user identifier that includes initial filter criteria;

processing an advertisement blocking indicator associated with the user identifier to determine if advertisement content is indicated as blocked for the user identifier;

if the advertisement content is indicated as blocked for the user identifier, then processing the service profile defined for the user identifier of the IMS user to modify initial filter criteria that relates to advertisement content so that advertisement content will not be forwarded to the IMS user based on the user identifier; and transmitting the service profile for the IMS user from the subscriber database to the network element with the modified initial filter criteria.

10. The method of claim 9 wherein processing the service profile defined for the user identifier of the IMS user to modify the initial filter criteria comprises:

removing the initial filter criteria that relates to advertisement content before transmitting the service profile to the network element.

11. The method of claim 9 wherein processing the service profile defined for the user identifier of the IMS user to modify the initial filter criteria comprises:

setting the initial filter criteria that relates to advertisement content to inactive before transmitting the service profile to the network element.

12. The method of claim 9 wherein processing the service profile defined for the user identifier of the IMS user to modify the initial filter criteria comprises:

receiving, in the subscriber database, advertisement information;

processing the initial filter criteria and the advertisement information to identify the initial filter criteria that relates to advertisement content; and modifying the portions of the initial filter criteria that relate to advertisement content.

13. The method of claim 12 wherein the advertisement information comprises a list of application servers that provide advertisement content in the IMS network.

14. The method of claim 9 wherein:

the subscriber database comprises a Home Subscriber Server (HSS); and the network element comprises one of a call session control function (CSCF) or an application server.

15. The method of claim 9 further comprising:

monitoring the status of the advertisement blocking indicator in the service profile of the IMS user;

if the status of the advertisement blocking indicator changes, then:

identifying the network element that previously received the service profile from the subscriber database;

generating updated initial filter criteria based on the change to the advertisement blocking indicator; and transmitting the service profile to the network element with the updated initial filter criteria.

16. An IP Multimedia Subsystem (IMS) network operable to block advertisement content to IMS users, the IMS network comprising:

a home subscriber server (HSS) that includes hardware operable to:

receive input that includes public user identifiers (PUID) for the IMS users and includes advertisement blocking indicators, provision service profiles for the IMS users to associate the PUIDs with advertisement blocking indicators, receive a request for a service profile for an IMS user from a network element in the IMS network, wherein the request includes a PUID for the IMS user, identify the service profile associated with the PUID that includes initial filter criteria, process an advertisement blocking indicator associated with the PUID to determine if advertisement content is indicated as blocked for the PUID, if the advertisement content is indicated as blocked for the user identifier, then process the service profile defined for the PUID of the IMS user to modify initial filter criteria that relates to advertisement content so that advertisement content will not be forwarded to the IMS user based on the PUID, and transmit the service profile for the IMS user to the network element in response to the request.

17. The IMS network of claim 16 wherein:

the network element is operable to receive the service profile associated with the PUID, to receive a SIP request that includes the PUID, and to process the modified initial filter criteria defined for the PUID to determine how to operate in response to the SIP request, wherein the modified initial filter criteria acts to block the advertisement content from being sent to the IMS user.

18. The IMS network of claim 16 wherein:

the HSS is further operable to remove the initial filter criteria that relates to advertisement content or set the initial filter criteria that relates to advertisement content to inactive before transmitting the service profile to the network element.

19. The IMS network of claim 16 wherein:

the HSS is further operable to receive advertisement information, to process the initial filter criteria and the advertisement information to identify the initial filter criteria that relates to advertisement content, and to modify the portions of the initial filter criteria that relate to advertisement content.

20. The IMS network of claim 16 wherein:

the HSS is further operable to monitor the status of the advertisement blocking indicator in the service profile of the IMS user; and if the status of the advertisement blocking indicator changes, then the HSS is further operable to identify the network element that previously received the service profile from the subscriber database, to generate updated initial filter criteria based on the change to the advertisement blocking indicator, and to transmit the service profile to the network element with the updated initial filter criteria.

* * * * *